A. N. Shattuck,
Water Elevator.
Nº 54,418. Patented May 1, 1866.
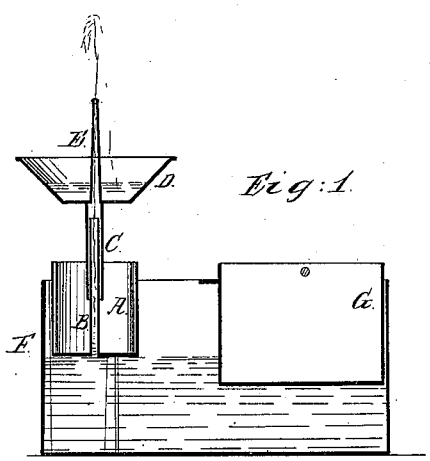
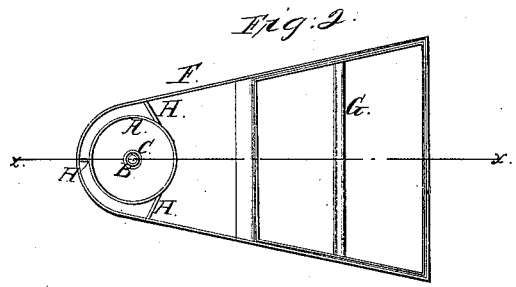
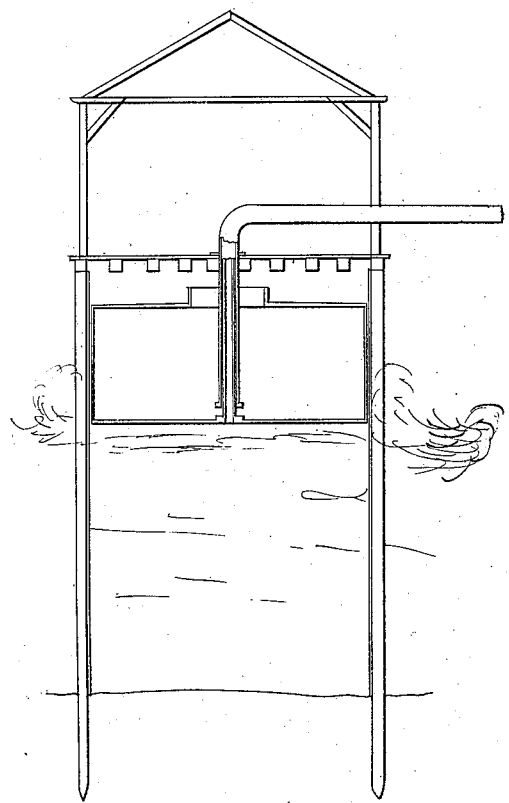
Witnesses:
Inventor:
A. N. Shattuck

UNITED STATES PATENT OFFICE.

A. N. SHATTUCK, OF SAN FRANCISCO, CALIFORNIA.

IMPROVEMENT IN APPARATUS FOR RAISING WATER BY WAVES.

Specification forming part of Letters Patent No. 54,418, dated May 1, 1866.

*To all whom it may concern:*

Be it known that I, A. N. SHATTUCK, of San Francisco, in the county of San Francisco and State of California, have invented a new and useful Improvement in Apparatus for Elevating Water; and I do hereby declare that the following is a full, clear, and exact description thereof, which will enable others skilled in the art to make and use the same, reference being had to the accompanying drawings, forming part of this specification, in which—

Figure 1 is a sectional view of an apparatus for elevating water, made according to my invention. Fig. 2 is a plan. Fig. 3 is intended as an illustration of the operation of an apparatus made on the principle of my invention when placed in the water along a sea-coast.

Similar letters of reference indicate like parts.

The object of this invention is to raise water by the action of the waves.

It consists in a floating vessel or buoy having a large area of surface placed in the water along a coast where the waves and swell will have full access to it, the vessel having an open tube fixed in its bottom, which tube is carried upward within a larger tube, which is connected with a reservoir fixed above the waves, or with a pipe that is conducted into a reservoir on the shore. Each of these tubes is provided with a check-valve to prevent the return of the water.

I have called my invention a "buoy-pump." It will be useful in supplying water for driving a water-wheel or other purposes, and can be applied on any coast where there is a continual swell of the water and where there are waves. The floating vessel is guided within a frame, or by means of the standards which support the upper tube or reservoir.

In Figs. 1 and 2 I have shown an apparatus which illustrates my invention, the frame or box F being taken for the purpose of illustration to represent an inclosure containing a large body of water whose agitation and rise and fall operate the pump and elevate the water.

At one end of the frame F are guides H, within or between which a buoy or floating vessel, A, is guided as it rises and falls with the water which sustains it. From the bottom of vessel A proceeds a vertical tube, B, whose height may be greater than the height of the vessel. This tube is open at both ends, its lower end opening through the bottom of the vessel, so that the water is free to ascend in it. Within the tube and near its bottom I place a check-valve which permits the water to rise in the tube, but does not permit it to return.

D is a reservoir to receive the water raised by the apparatus. It has an open tube, C, extending downward from it in line with the tube B, already mentioned, and is of larger diameter, so that the tube B can move freely within it, and packing is applied at the upper end of tube B to prevent water from getting between them from above.

Tube C is carried up above the bottom of the reservoir a little distance, and is provided with a check-valve, and its upper end is connected with a nozzle, E, if desired, or with a pipe to conduct the water to any place or reservoir having about the same altitude as the reservoir D.

G is an open box by means of which mechanical force can be employed to agitate the water and cause it to rise and fall in the inclosure F, and thereby drive a portion of the water upward through the tube B, said box being only intended as a means of illustrating the invention, and not forming in itself any part thereof. In practice, the agitation of the water is brought about by natural causes, and when my invention is applied on a coast its manner of operation is like the representation in Fig. 3, where, in red outline, a buoy-pump is seen set on the water between vertical guides.

The vessel A is allowed to float upon and rise and fall with the water, and its action is as follows: When it is carried upward the valve in its tube B will be closed and as the distance between it and the upper valve is lessened by the ascent of the tube B within tube C part of the water contained in them will be forced upward through the valve of tube C. When the floating vessel falls with a subsiding wave a partial vacuum will be formed in tubes B and C, and water from without will enter tube B through its valve and fill it again, so that when the vessel A is raised by the succeeding wave a portion of the water will be passed through the upper valve, as before. This action is repeated constantly with each rise and fall of the water, whether it be from the regular swell of the ocean or from the motion of waves.

The tube C is made stationary by any suitable means, and care is to be taken to guard the float and its tube B against displacement, because it is important to the successful and easy action of the apparatus that the tube B be always in a position to enter the tube C when the float is rising.

I claim as new and desire to secure by Letters Patent—

The buoy-pump made to act by the agitation of water, substantially as above described, consisting of a floating vessel, A, and its tube B, combined with a fixed tube, C, both tubes being provided with check-valves, and the floating vessel A being guided in any suitable frame, as above set forth.

A. N. SHATTUCK.

Witnesses:
W. H. LAWRENCE,
S. W. PARISH.